United States Patent
Cui

(10) Patent No.: US 11,480,434 B2
(45) Date of Patent: Oct. 25, 2022

(54) INITIAL LOCALIZATION

(71) Applicant: Pony AI Inc., Grand Cayman (KY)

(72) Inventor: Piaoyang Cui, Santa Clara, CA (US)

(73) Assignee: Pony AI Inc., Grand Cayman (KY)

( * ) Notice: Subject to any disclaimer, the term of this patent is extended or adjusted under 35 U.S.C. 154(b) by 79 days.

(21) Appl. No.: 16/781,726

(22) Filed: Feb. 4, 2020

(65) Prior Publication Data

US 2021/0239471 A1 Aug. 5, 2021

(51) Int. Cl.
*G01C 21/28* (2006.01)
*G07C 5/08* (2006.01)
*G01C 21/16* (2006.01)
*G01C 22/00* (2006.01)

(52) U.S. Cl.
CPC ........... *G01C 21/28* (2013.01); *G01C 21/165* (2013.01); *G01C 22/00* (2013.01); *G07C 5/0841* (2013.01)

(58) Field of Classification Search
CPC ......... B60W 2520/28; B60W 2520/26; B60W 2520/10; B60W 30/143; B60W 30/18172; B60W 30/18; G05D 1/0278; G05D 1/0223; G05D 1/0272; G05D 2201/0213; G01C 21/28; G01C 22/00
See application file for complete search history.

(56) References Cited

U.S. PATENT DOCUMENTS

| | | | |
|---|---|---|---|
| 6,360,165 B1 * | 3/2002 | Chowdhary | ........... G01C 21/28 701/495 |
| 8,437,501 B1 | 5/2013 | Anguelov | |
| 9,342,888 B2 | 5/2016 | Menashe et al. | |
| 10,108,192 B1 | 10/2018 | LaForge et al. | |
| 2006/0271295 A1 * | 11/2006 | McLaren | ................ G01S 19/49 701/472 |
| 2011/0184644 A1 * | 7/2011 | McBurney | ............. G01C 21/26 701/532 |
| 2013/0325334 A1 * | 12/2013 | Mian | .................... G05D 1/0278 701/518 |

(Continued)

FOREIGN PATENT DOCUMENTS

WO WO-2013026396 A1 * 2/2013 ............. B60C 23/06

OTHER PUBLICATIONS

Chang Sup Kim, Jung-Hyen Park, Keum-Shik Hong and Man Hyung Lee, "Improving odometry accuracy for car-like vehicles by using tire radii measurements," 30th Annual Conference of IEEE Industrial Electronics Society, 2004. IECON 2004, 2004, pp. 2546-2551 vol. 3, doi: 10.1109/IECON.2004.1432203. (Year: 2004).*

(Continued)

*Primary Examiner* — Rachid Bendidi
*Assistant Examiner* — Selena M Jin
(74) *Attorney, Agent, or Firm* — Sheppard Mullin Richter & Hampton LLP

(57) ABSTRACT

Provided herein is a system comprising: one or more processors; and a memory storing instructions that, when executed by the one or more processors, causes the system to perform: obtaining a previous pose of a vehicle; acquiring one or more previous readings corresponding to one or more wheel encoders during the previous pose; acquiring one or more readings corresponding to one or more wheel encoders acquired after the previous pose; and adjusting the previous pose based on the one or more readings to obtain a current pose.

14 Claims, 7 Drawing Sheets

(56) References Cited

U.S. PATENT DOCUMENTS

| | | | |
|---|---|---|---|
| 2015/0239298 A1* | 8/2015 | Kretschmann | B60C 11/246 |
| | | | 701/33.7 |
| 2017/0254632 A1* | 9/2017 | Liu | B60C 23/0488 |
| 2017/0261326 A1* | 9/2017 | Mizutani | G01P 3/50 |
| 2019/0138000 A1* | 5/2019 | Hammond | G05D 1/0231 |
| 2019/0271787 A1* | 9/2019 | Pyke | G01C 21/165 |
| 2019/0293432 A1* | 9/2019 | Demiral | B62D 15/021 |
| 2019/0355132 A1* | 11/2019 | Kushleyev | G06T 7/62 |
| 2020/0064155 A1* | 2/2020 | Wang | G01D 5/12 |
| 2020/0166344 A1* | 5/2020 | Knutson | G01C 21/12 |
| 2020/0172166 A1* | 6/2020 | Chang | G05D 1/02 |
| 2022/0017105 A1* | 1/2022 | Nasu | B60W 40/109 |

OTHER PUBLICATIONS

Chunfang, X., "Translation of WO-2013026396-A1", 2013 (Year: 2013).*

* cited by examiner

INITIAL LOCALIZATION

TECHNICAL FIELD

The present disclosure relates generally to vehicles such as assisted-driving vehicles or autonomous vehicles (AVs), and in particular, some embodiments relate to determining an initial location and orientation of vehicles, or determining a pose relative to a map or a road.

BACKGROUND

Currently, Global Positioning System (GPS) signals may be used to localize a vehicle at initial startup. Localizing may include determining a location and an orientation of the vehicle relative to map coordinates and road coordinates, and may entail determining roll, pitch, and yaw angles. However, GPS signals are occasionally unreliable, especially in occluded areas such as under trees, places surrounded by large buildings, or in tunnels. Other current methods to localize a vehicle may be time-consuming and inaccurate. These shortfalls are addressed by the present disclosures, which provide an efficient and effective system to localize a vehicle even when GPS signals are unavailable.

SUMMARY

Various embodiments of the present disclosure provide a system comprising: one or more processors; and a memory storing instructions that, when executed by the one or more processors, causes the system to perform: obtaining a previous pose of a vehicle; acquiring one or more previous readings corresponding to one or more wheel encoders during the previous pose; acquiring one or more readings corresponding to one or more wheel encoders acquired after the previous pose; and adjusting the previous pose based on the one or more readings to obtain a current pose.

In some embodiments, the previous pose comprises any of a position, orientation, or velocity of the vehicle.

In some embodiments, the adjusting the previous pose comprises: determining whether respective changes for each wheel between the one or more previous readings and the one or more readings match; and in response to determining that the respective changes for each wheel match: determining a change in a position of the vehicle from the previous pose based on the one or more readings; and determining a current pose based on the change in the position and the previous pose.

In some embodiments, the determining a change in the position of the vehicle comprises: determining a number of revolutions corresponding to the respective changes for each wheel; and determining a distance travelled by each wheel since the previous pose based on the number of revolutions and a diameter of each wheel.

In some embodiments, the obtaining a previous pose of a vehicle comprises obtaining the previous pose from a GPS or an IMU.

In some embodiments, the obtaining the previous pose of the vehicle comprises obtaining a most recent pose of the vehicle before shutdown of the system.

In some embodiments, the adjusting the previous pose comprises compensating the one or more readings for wheel slippage.

In some embodiments, the compensating the one or more readings for wheel slippage comprises compensating the one or more readings based on motor current data.

In some embodiments, the adjusting the previous pose comprises: in response to determining that the respective changes for each wheel do not match: determining a change in the position of the vehicle from the previous pose based on the one or more readings, data from GPS, data from a LiDAR sensor, or data from an IMU.

In some embodiments, the adjusting the previous pose comprises: in response to determining that the respective changes for each wheel do not match: determining a change in the position of the vehicle from the previous pose based on estimated changes in positions of each wheel.

Various embodiments of the present disclosure provide a method implemented by a computing system including one or more processors and storage media storing machine-readable instructions, wherein the method is performed using the one or more processors, the method comprising: obtaining a previous pose of a vehicle; acquiring one or more previous readings corresponding to one or more wheel encoders during the previous pose; acquiring one or more readings corresponding to one or more wheel encoders acquired after the previous pose; and adjusting the previous pose based on the one or more readings to obtain a current pose.

In some embodiments, the previous pose comprises any of a position, orientation, or velocity of the vehicle.

In some embodiments, the adjusting the previous pose comprises: determining whether respective changes for each wheel between the one or more previous readings and the one or more readings match; and in response to determining that the respective changes for each wheel match: determining a change in a position of the vehicle from the previous pose based on the one or more readings; and determining a current pose based on the change in the position and the previous pose.

In some embodiments, the determining a change in the position of the vehicle comprises: determining a number of revolutions corresponding to the respective changes for each wheel; and determining a distance travelled by each wheel since the previous pose based on the number of revolutions and a diameter of each wheel.

In some embodiments, the obtaining a previous pose of a vehicle comprises obtaining the previous pose from a GPS or an IMU.

In some embodiments, the obtaining the previous pose of the vehicle comprises obtaining a most recent pose of the vehicle before shutdown of the computing system.

In some embodiments, the adjusting the previous pose comprises compensating the one or more readings for wheel slippage.

In some embodiments, the compensating the one or more readings for wheel slippage comprises compensating the one or more readings based on motor current data.

In some embodiments, the adjusting the previous pose comprises: in response to determining that the respective changes for each wheel do not match: determining a change in the position of the vehicle from the previous pose based on the one or more readings, data from GPS, data from a LiDAR sensor, or data from an IMU.

In some embodiments, the adjusting the previous pose comprises: in response to determining that the respective changes for each wheel do not match: determining a change in the position of the vehicle from the previous pose based on estimated changes in positions of each wheel.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
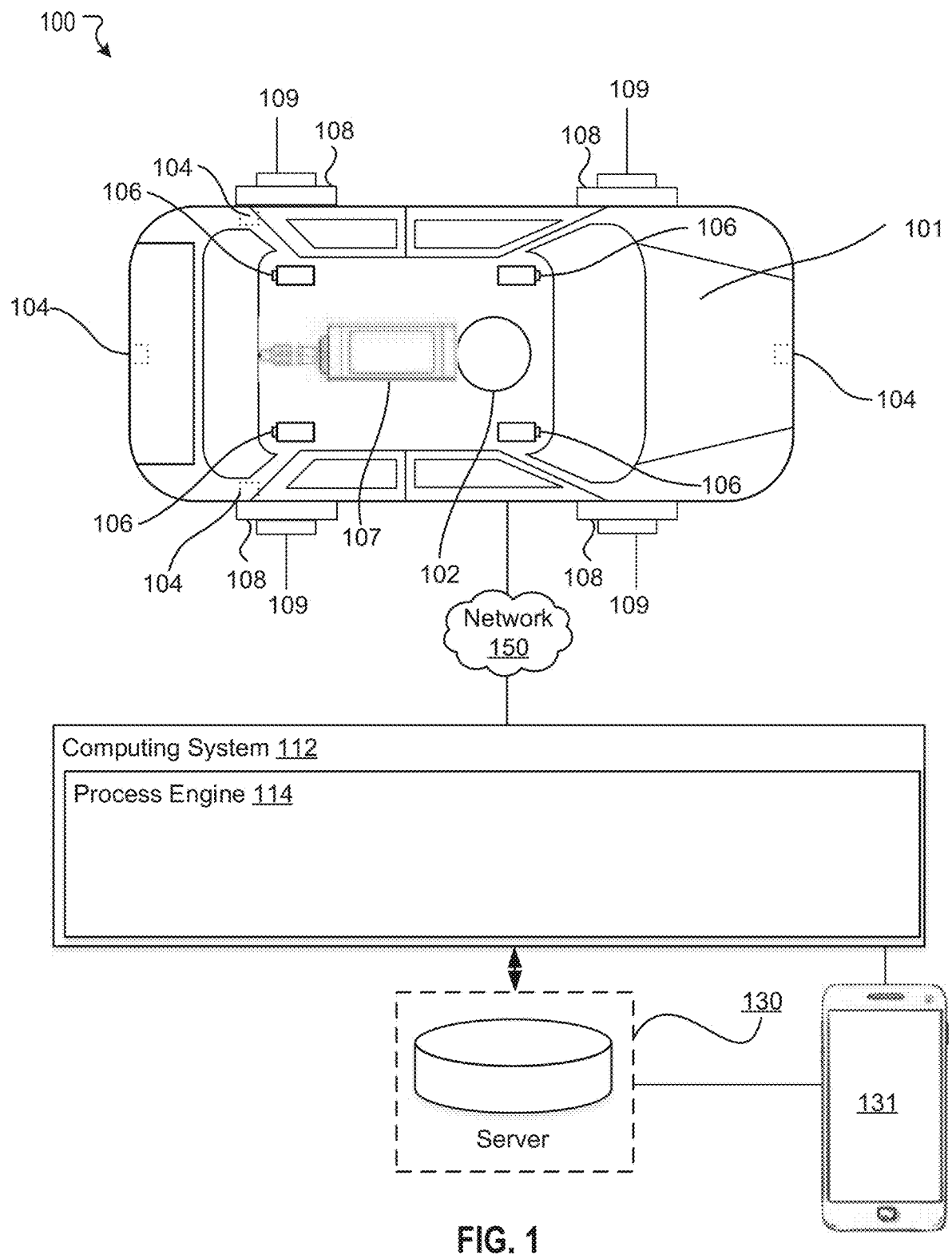
FIG. 1 illustrates an example environment of a system according to one or more embodiments of the present disclosure.

FIG. 1 illustrates an example environment 100 of a system that obtains a previous pose of a vehicle, acquires one or more previous readings corresponding to one or more wheel encoders during the previous pose, acquires one or more readings corresponding to one or more wheel encoders acquired after the previous pose, and adjusts the previous pose based on the one or more readings to obtain a current pose. In FIG. 1, a vehicle such as an autonomous vehicle 101 may include myriad sensors (LiDAR systems 102, radar systems 104, cameras 106, GPS, sonar, ultrasonic, one or more IMUs (inertial measurement units) 107, accelerometers, gyroscopes, magnetometers, and FIR (far infrared) sensors) to detect and identify objects in the surrounding. Additionally, the vehicle 101 may include wheels 108 and a wheel encoder 109 on each of the wheels 108. The wheel encoder 109 may comprise an optical encoder or a magnetic encoder. In some examples, the LiDAR systems 102 can generate a three-dimensional map of the environment. The LiDAR systems 102 can also detect objects in the environment. In another example, the radar systems 104 can determine distances and speeds of objects around the vehicle 101, and may be configured for adaptive cruise control and/or accident avoidance and blind spot detection. In another example, the cameras 106 can capture and process image data to detect and identify objects, such as road signs, as well as deciphering content of the objects, such as speed limit posted on the road signs. Such objects may include, but not limited to, pedestrians, road signs, traffic lights, and/or other vehicles, for example. In some embodiments, the cameras 106 can recognize, interpret, and analyze road signs (e.g., speed limit, school zone, construction zone, etc.) and traffic lights (e.g., red light, yellow light, green light, flashing red light, etc.). The vehicle 101 can also include myriad actuators to propel and navigate the vehicle 101 in the surrounding. Such actuators may include, for example, any suitable electro-mechanical devices or systems to control a throttle response, a braking action, a steering action, etc. In some embodiments, based on image data captured by the cameras 106, the vehicle 101 can adjust vehicle speed based on speed limit signs posted on roadways. For example, the vehicle 101 can maintain a constant, safe distance from a vehicle ahead (e.g., adaptive cruise control). In this example, the vehicle 101 maintains this safe distance by constantly adjusting its vehicle speed to that of the vehicle ahead.

In various embodiments, the vehicle 101 may navigate through roads, streets, and/or terrain with limited or no human input, and based on data from the myriad sensors. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 101 can effectuate any control to itself that a human driver can on a conventional vehicle. For example, the vehicle 101 can accelerate, brake, turn left or right, or drive in a reverse direction just as a human driver can on the conventional vehicle. The vehicle 101 can also sense environmental conditions, gauge spatial relationships (e.g., distances between objects and itself), detect and analyze road signs just as the human driver. Moreover, the vehicle 101 can perform more complex operations, such as parallel parking, parking in a crowded parking lot, collision avoidance, etc., without any human input.

In various embodiments, at least one computing system 112 that includes one or more processors and memory, may be connected, over a network 150, to a device 131. The at least one computing system 112 may be physically and/or electrically connected to a vehicle 101. In some embodiments, the at least one computing system 112 may be integrated as part of the vehicle 101. One or more users may, through the device 131, request, view, and/or access details of the sensors 102, 104, 106, 107, wheel encoders 109, and of the vehicle 101.

The processors may be configured to perform various operations by interpreting machine-readable instructions. In some embodiments, the example environment 100 may be implemented as a data platform. In some embodiments, the example environment 100 may be configured to interact with the at least one computing system 112 of the data platform. In various embodiments, the at least one computing system 112 of the data platform may coordinate and/or control one or more operations of obtaining a previous pose of the vehicle 101; acquiring one or more previous readings corresponding to one or more of the wheel encoders 109 during the previous pose; acquiring one or more readings corresponding to one or more wheel encoders 109 acquired after the previous pose; and adjusting the previous pose based on the one or more readings to obtain a current pose. In some embodiments, the at least one computing system 112 may include a process engine 114. The process engine 114 may be executed by the processor(s) of the computing system 112 to perform various operations including those operations described in reference to the at least one computing system 112. In general, the process engine 114 may be implemented, in whole or in part, as software that is capable of running on one or more computing devices or systems. In one example, the process engine 114 may be implemented as or within a software application running on one or more computing devices (e.g., user or client devices) and/or one or more servers (e.g., network servers or cloud servers, servers 130). The environment 100 may also include the one or more servers 130 accessible to the computing system 112. The one or more servers 130 may store and update information generated or output from the one or more computing systems 112. For example, the one or more servers 130 may store data indicating information from the wheel encoders 109.

The one or more servers 130 may be accessible to the computing system 112 either directly or over the network 150. In some instances, the one or more servers 130 may include federated data stores, databases, or any other type of data source from which data may be stored and retrieved, for example. In some implementations, the one or more servers 130 may include various types of data sets on which determinations of accuracy or consistency with other information can be made. In general, a user operating a computing device can interact with the computing system 112 over the network 150, for example, through one or more graphical user interfaces and/or application programming interfaces.

The at least one computing system 112 may determine a previous pose of the vehicle 101. In some embodiments, the previous pose of the vehicle 101 may comprise a location, orientation, and/or velocity of the vehicle 101. The orientation of the vehicle 101 may comprise a rho, pitch, and/or yaw of the vehicle 101. In some embodiments, the previous pose of the vehicle 101 may be a most recent pose of the vehicle 101 when the at least one computing system 112 was shut down or terminated. For example, the at least one computing system 112 may be shut down while the vehicle 101 is still driving. The at least one computing system 112 may reboot, and upon rebooting, resume or determine a current pose of the vehicle 101 using wheel encoders 109, once the at least one computing system 112 is turned on again, as described in FIGS. 2-4. In some examples, the at least one computing system 112 may be shutdown while the vehicle 101 is also shutdown. Once the vehicle 101 is turned on again, the at least one computing system 112 may reestablish a pose of the vehicle 101.

Figure 2:
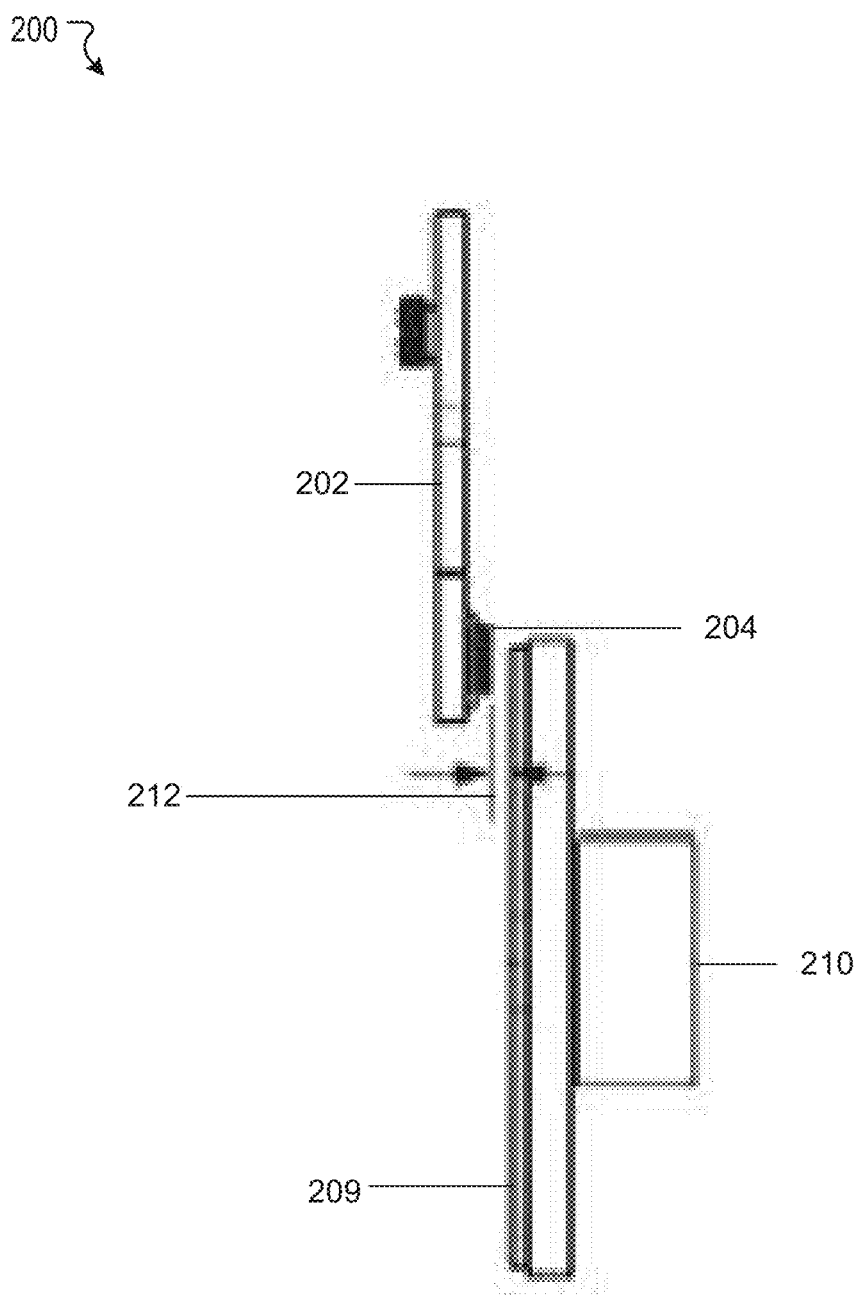
FIGS. 2-3 illustrate example implementations of a wheel encoder according to embodiments of the present disclosure.

FIG. 2 illustrates an example implementation 200 of a wheel encoder such as the wheel encoder 109. In some examples, the wheel encoder may comprise a magnetic encoder. The magnetic encoder may comprise a circuit board 202, a sensor 204, and a magnet 209. The sensor 204 may comprise a Hall effect sensor or a magnetoresistive sensor. A gap 212 may be disposed between the sensor 204 and the magnet 209. The magnet 209 may comprise a ring magnet. The magnet 209 may be attached to a shaft 210 of a motor that rotates a wheel. In some examples, when the motor rotates the wheel, the magnet 209 is also rotated. The sensor 204 may detect a change in the magnetic field while the magnet 209 rotates and count a number of times that the magnet 209 rotates. If the sensor 204 is a Hall effect sensor, the sensor 204 may detect a change in a voltage of the circuit board 202 due to magnetic deflection of electrons. If the sensor 204 is a magnetoresistive sensor, the sensor 204 may detect a change in resistance caused by a magnetic field of the magnet 209.

Figure 3:
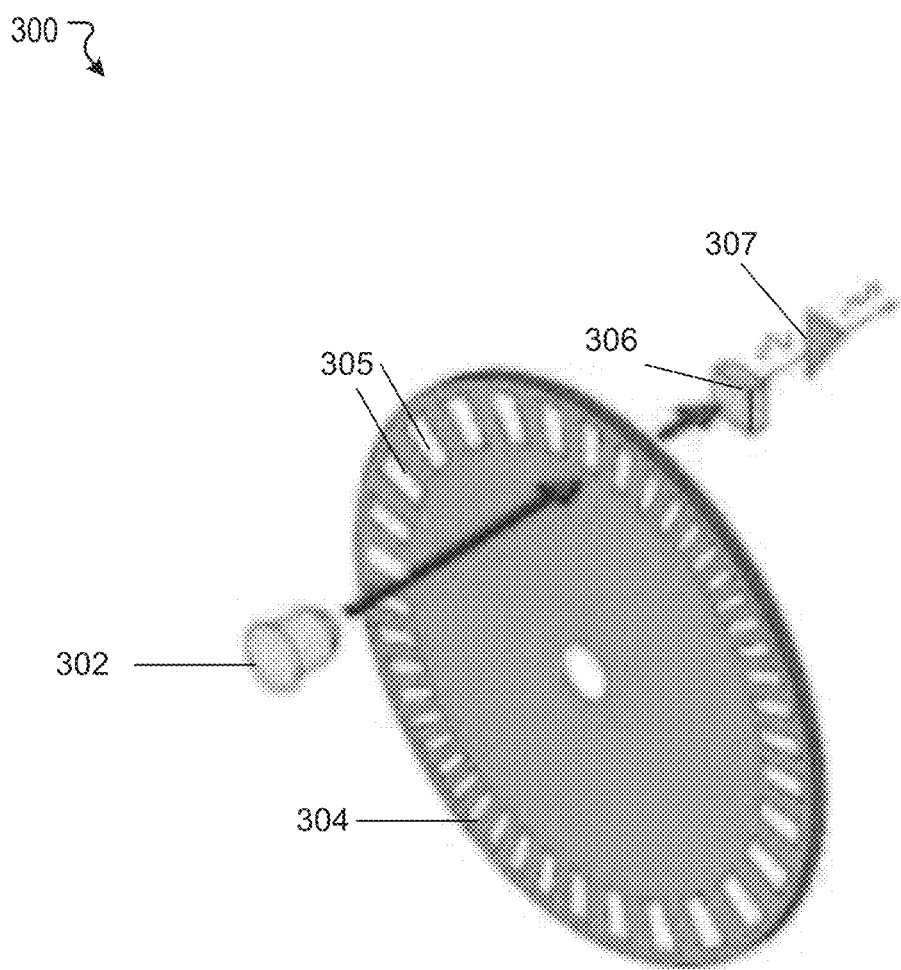

FIG. 3 illustrates an example implementation 300 of a wheel encoder such as the wheel encoder 109. In some examples, the wheel encoder may comprise an optical encoder. The optical encoder may comprise a light source 302, such as a LED, a disk 304 including gaps 305, one or more detectors 306, and a processor 307. The one or more detectors 306 detect a pattern of light emitted by the light source 302. In some embodiments, the light source 302 emits a single light beam that is split into two separate beams. The two separate beams may be aligned as they travel through the gaps 305 of the disk 304. The one or more detectors 306 detect a relative phase, for example, a leading or lagging signal in a phase relationship between the two separate beams. Each of the one or more detectors 306 may detect an individual beam as it travels through a gap 305.

Figure 4A:
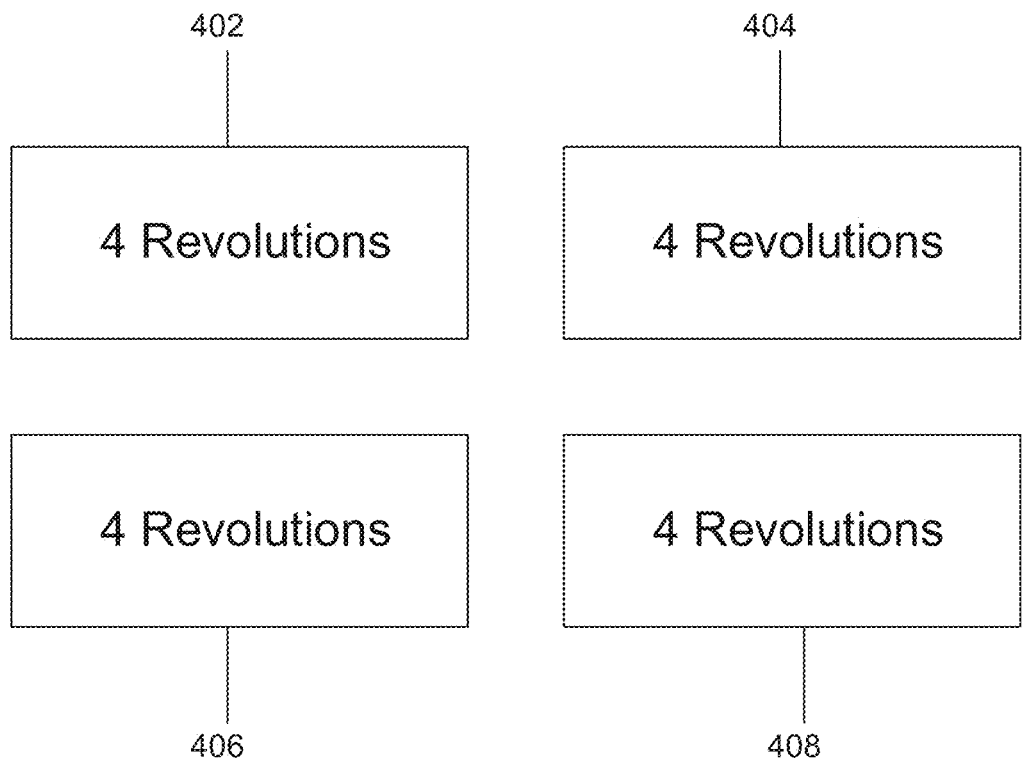
FIGS. 4A, 4B, and 5 illustrate example implementations of a wheel encoder and a computing system according to embodiments of the present disclosure.
Figure 4B:
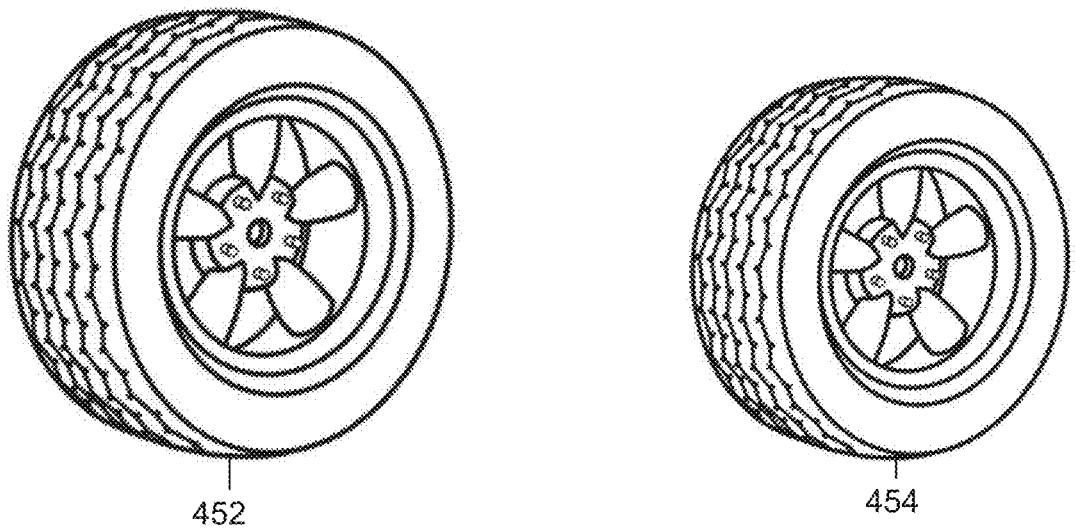

FIG. 4A illustrates an example implementation of a computing system such as the computing system 112, and a wheel encoder, such as the wheel encoder 109 of FIG. 1, or the wheel encoders illustrated in FIG. 2 or 3. In FIG. 4A, the computing system may acquire readings from the wheel encoders after the computing system or a vehicle, such as the vehicle 101, has been shut down or terminated. A pose, including a position and/or orientation, of the vehicle may be known at the time the computing system or the vehicle was shut down or terminated, for example, from wheel encoder readings at the time the computing system or vehicle was shut down or terminated. The readings 402, 404, 406, and 408 from the wheel encoders may be from each individual wheel encoder, for example, from a front left wheel encoder, a front right wheel encoder, a rear left wheel encoder, and a rear right wheel encoder, respectively. The readings 402, 404, 406, and 408 may indicate a distance that each wheel on the vehicle has traveled since a most recently known pose of the vehicle, for example, at the time the computing system or the vehicle was shut down or terminated. In the example of FIG. 4A, the readings 402, 404, 406, and 408 indicate that each wheel has travelled a distance of 4 revolutions after a most recently known pose of the vehicle. Thus, the readings 402, 404, 406, and 408 may indicate that each wheel has travelled a same distance, meaning that the vehicle has travelled in a straight line since its most recent pose. If the readings 402, 404, 406, and 408 indicate that each wheel has travelled a same distance, the computing system may determine a current pose of the vehicle by converting the readings 402, 404, 406, and 408 from revolutions to actual distance, and adding that actual distance to the most recent position of the vehicle, while keeping a same orientation as the most recent orientation. To convert the readings from revolutions to actual distance, the computing system may use a diameter of one of the wheels, as illustrated in FIG. 4B. In some embodiments, the diameter of one of the wheels may change from time to time due to weather, temperature, barometric pressure, and/or tire pressure changes. For example, the diameter of a wheel 452 may decrease, as illustrated in wheel 454. The diameter of each of the wheels may be dynamically calibrated or measured using sensor data such as from GPS, IMU, and/or LiDAR, either at preset intervals or whenever a sensor used to obtain the sensor data is available. The computing system may determine the actual distance based on the dynamically updated data of the diameter of each of the wheels. For example, the computing system may multiply a number of revolutions as indicated by the wheel encoder data with a diameter of a wheel at a time of, or a time closest to, a time that the wheel encoder data was acquired, and multiply the result by pi to obtain the actual distance. For example, if the wheel encoder data was acquired at 1:00 PM, the diameter of the wheel may also be taken at 1:00 PM, or using a sensor reading closest to 1:00 PM. Additionally, if the readings 402, 404, 406, and 408 indicate that the vehicle has not moved since its most recently known pose, the current pose is determined to be the most recently known pose of the vehicle. In some embodiments, the computing system may determine a current pose and/or position of the vehicle based on a difference between wheel encoder readings at the time the computing system or vehicle was shut down or terminated and wheel encoder readings after the computing system or vehicle was shut down or terminated.

Figure 5:
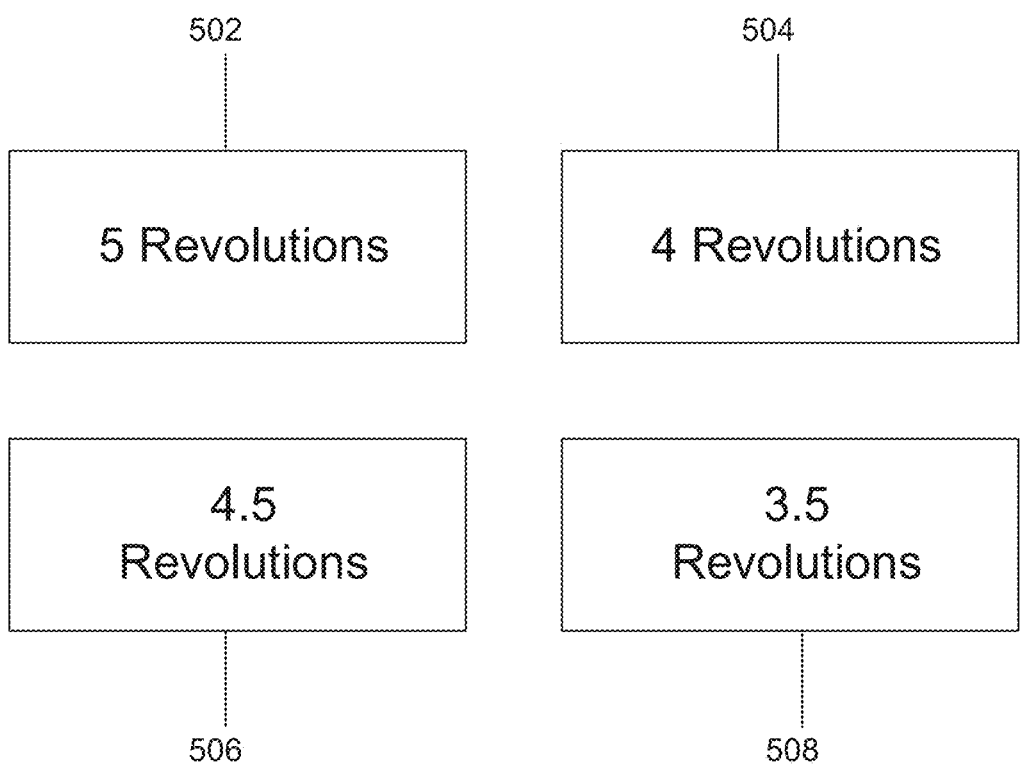

FIG. 5 illustrates an example implementation of a computing system such as computing system 112 and a wheel encoder, such as the wheel encoder 109 of FIG. 1, or the wheel encoders illustrated in FIG. 2 or 3. In FIG. 5, readings 502, 504, 506, and 508 from the wheel encoders do not match. Thus, the vehicle is determined to not have travelled in a straight line since a most recent pose. In such a case, the computing system may determine a current position using any of, or a combination of, the wheel encoder readings 502, 504, 506, and 508 for each wheel, GPS, and/or IMU readings. For example, a current position of each wheel may be determined or estimated by a distance or a sum of distances travelled since a most recent pose. A current position and/or orientation of the vehicle may be determined based on the determined or estimated position of each wheel.

In some embodiments, one or more of the wheel encoder readings 402, 404, 406, and 408, or 502, 504, 506, and 508, may be compensated for wheel slippage or sinkage. For example, if the vehicle is driving on snow, sand, or loose dirt, a rotation of one or more of the wheels may not be fully translated into a linear distance travelled. The wheel encoder readings 402, 404, 406, and 408, or 502, 504, 506, and 508, may be compared with a Z-axis gyro of an IMU, and/or motor currents which are applied to each of the wheels. The motor currents may be approximately proportional to an amount of torque applied to each of the wheels in order to propel the vehicle to overcome a rolling resistance between the wheel and a surface on which the wheel is driving. If slippage or sinkage occurs, the amount of torque applied to a wheel may be decreased compared to an amount of torque applied to a wheel that is linearly translating. For example, an amount of wheel slippage or sinkage may be determined based on a different between expected motor currents applied to each of the wheels if the wheels are linearly translating and measured motor currents actually applied to each of the wheels.

Figure 6:
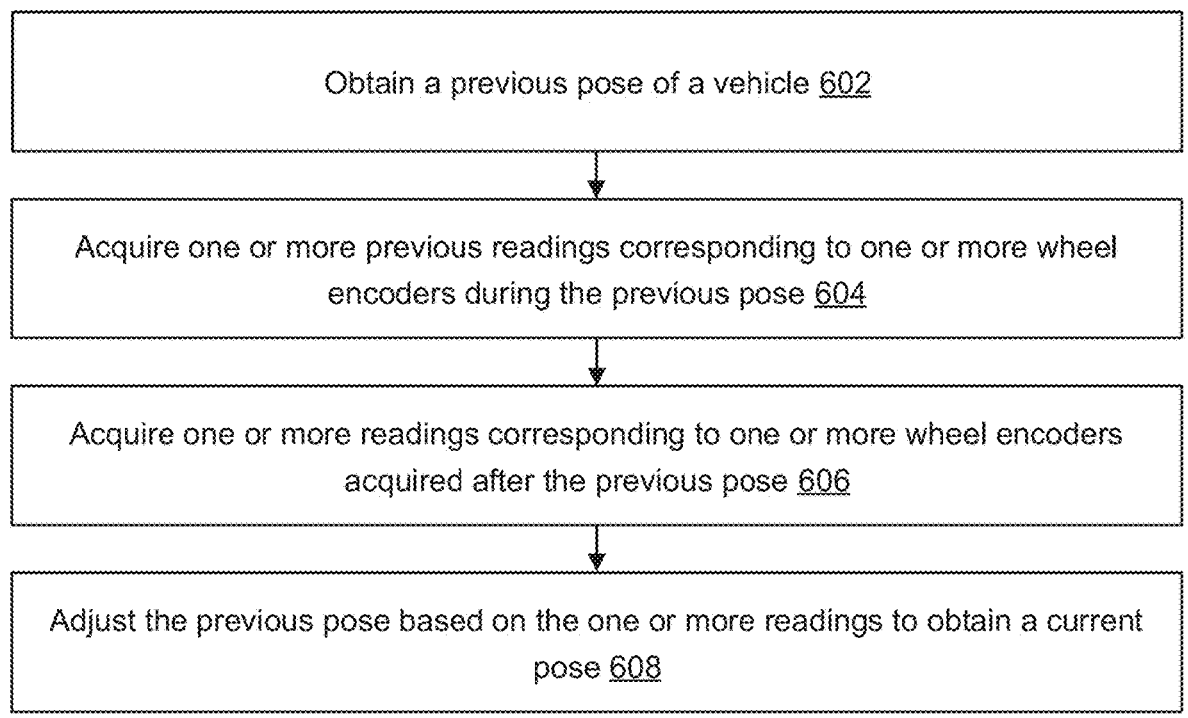
FIG. 6 illustrates a flowchart of an example of a method according to an embodiment of the present disclosure.

FIG. 6 illustrates a flowchart of a method according to some embodiments. In this and other flowcharts, the flowchart 600 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 6.

In step 602, a computing system may obtain a previous pose of a vehicle. In step 604, the computing system may acquire one or more previous readings corresponding to one or more wheel encoders during the previous pose. For example, the computing system may acquire encoder readings from each wheel at a time the vehicle and/or the computing system was shut down or terminated. In step 606, the computing system may acquire one or more readings corresponding to one or more wheel encoders acquired after the previous pose. In step 608, the computing system may adjust the previous pose based on the one or more readings to obtain a current pose, such as described with respect to FIGS. 4 and 5.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
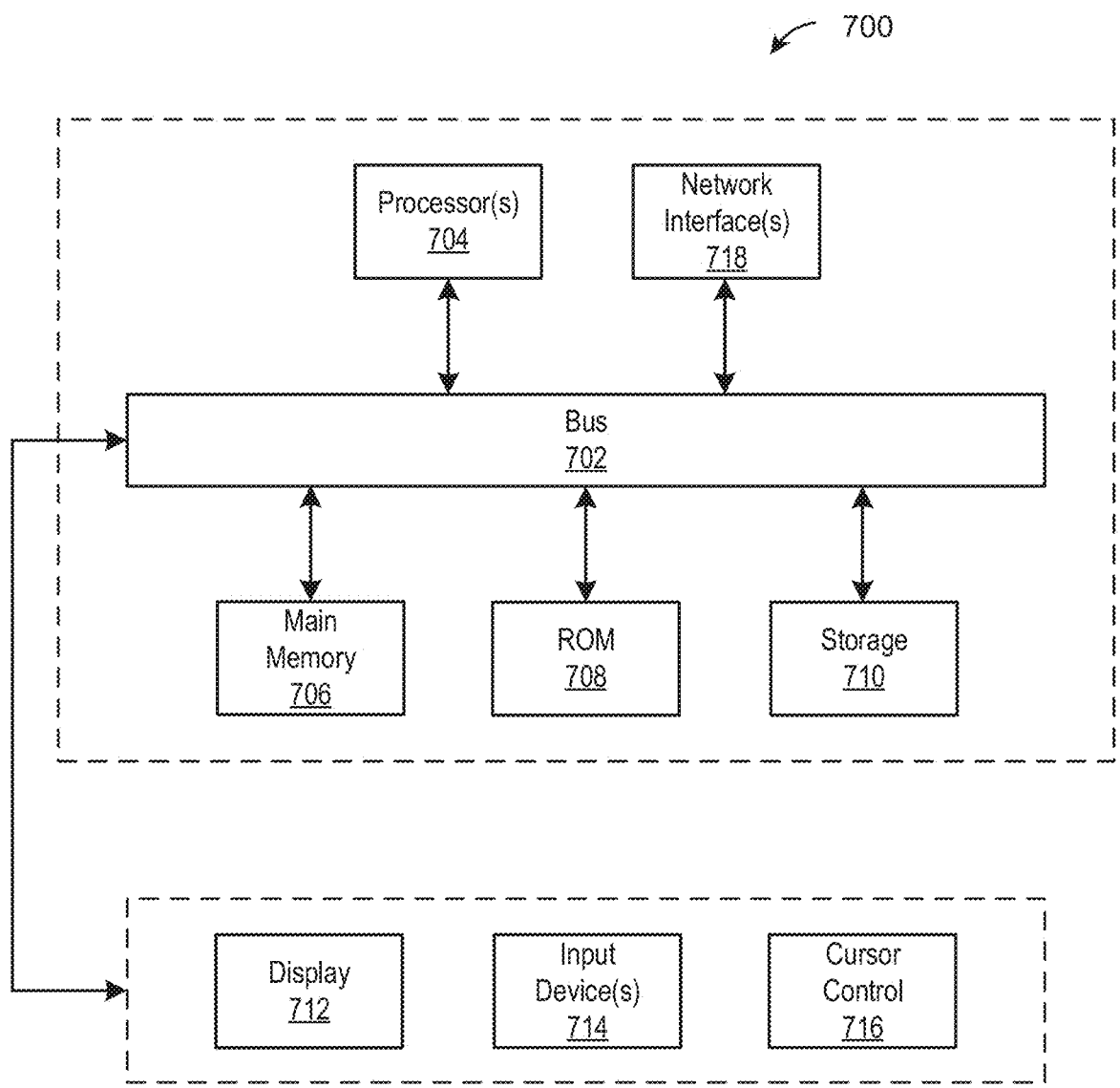
FIG. 7 is a diagram of an example computer system for implementing the features disclosed herein.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to output device(s) 712, such as a cathode ray tube (CRT) or LCD display (or touch screen), for displaying information to a computer user. Input device(s) 714, including alphanumeric and other keys, are coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which may include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

LANGUAGE

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system comprising:
    wheel encoders corresponding to respective wheels of a vehicle, wherein each wheel encoder of the wheel encoders comprises one of a magnetic encoder and an optical encoder, wherein the magnetic encoder comprises:
        a circuit board;
        a magnet; and
        a Hall effect sensor or a magnetoresistive sensor; and
    wherein the optical encoder comprises:
        a light source;
        a disk comprising one or more gaps; and
        one or more detectors that detect a pattern of light emitted by the light source travelling through the one or more gaps;
    one or more processors; and
    a memory storing instructions that, when executed by the one or more processors, causes the system to perform:
        obtaining a previous pose of the vehicle;
        acquiring previous readings corresponding to the wheel encoders during the previous pose;
        acquiring second readings corresponding to the wheel encoders acquired after the previous pose;
        determining an amount of slippage by taking a difference between expected motor currents applied to the wheels in a scenario in which the wheels are linearly translating and measured motor currents actually applied to the respective wheels, and based on a Z-axis gyro of an inertial measurement unit (IMU);
        compensating the one or more second readings for wheel slippage based on the determined amount of slippage;
        adjusting the previous pose based on the one or more compensated second readings to obtain a current pose, the adjusting comprising converting the compensated second readings from revolutions to an actual distance by determining instantaneous diameters of the wheels using a LiDAR sensor to obtain one or more three-dimensional (3D) images of the wheels, a global positioning system (GPS), and an inertial measurement unit (IMU) to collectively determine the previous pose of the vehicle, wherein the instantaneous diameters are determined at a same time as the compensated second readings were obtained in order to compensate for changes in the instantaneous diameters due to at least three selected from a group consisting of weather, temperature, barometric pressure, and tire pressure changes; and navigating the vehicle based on the current pose.

2. The system of claim 1, wherein the previous pose comprises any of a position, orientation, or velocity of the vehicle.

3. The system of claim 1, wherein the adjusting the previous pose comprises:
- determining whether respective changes for each wheel between the one or more previous readings and the one or more readings match; and
- in response to determining that the respective changes for each wheel match:
  - determining a change in a position of the vehicle from the previous pose based on the one or more readings; and
  - determining a current pose based on the change in the position and the previous pose.

4. The system of claim 3, wherein the determining a change in the position of the vehicle comprises:
- determining a number of revolutions corresponding to the respective changes for each wheel; and
- determining a distance travelled by each wheel since the previous pose based on the number of revolutions and a diameter of each wheel.

5. The system of claim 1, wherein the obtaining the previous pose of the vehicle comprises obtaining a most recent pose of the vehicle before shutdown of the vehicle.

6. The system of claim 3, wherein the adjusting the previous pose comprises:
- in response to determining that the respective changes for each wheel do not match:
  - determining a change in the position of the vehicle from the previous pose based on the one or more readings, data from GPS, data from a LiDAR sensor, or data from an IMU.

7. The system of claim 3, wherein the adjusting the previous pose comprises:
- in response to determining that the respective changes for each wheel do not match:
  - determining a change in the position of the vehicle from the previous pose based on estimated changes in positions of each wheel.

8. A method implemented by a computing system including one or more processors and non-transitory storage media storing machine-readable instructions, wherein the method is performed using the one or more processors, the method comprising:
- obtaining a previous pose of a vehicle;
- acquiring previous readings corresponding to wheel encoders during the previous pose, the wheel encoders corresponding to respective wheels of a vehicle, wherein each wheel encoder of the wheel encoders comprises one of a magnetic encoder and an optical encoder, wherein the magnetic encoder comprises:
  - a circuit board;
  - a magnet; and
  - a Hall effect sensor or a magnetoresistive sensor; and
- wherein the optical encoder comprises:
  - a light source;
  - a disk comprising one or more gaps; and
- one or more detectors that detect a pattern of light emitted by the light source travelling through the one or more gaps;
- acquiring second readings corresponding to the wheel encoders acquired after the previous pose;
- determining an amount of slippage by taking a difference between expected motor currents applied to the wheels in a scenario in which the wheels are linearly translating and measured motor currents actually applied to the respective wheels, and based on a Z-axis gyro of an inertial measurement unit (IMU);
- compensating the one or more second readings for wheel slippage based on the determined amount of slippage;
- adjusting the previous pose based on the one or more compensated second readings to obtain a current pose, the adjusting comprising converting the compensated second readings from revolutions to an actual distance by determining instantaneous diameters of the wheels using a LiDAR sensor to obtain one or more three-dimensional (3D) images of the wheels, a global positioning system (GPS) to determine a current pose of the vehicle, and an inertial measurement unit (IMU) to determine a previous pose of the vehicle, wherein the instantaneous diameters are determined at a same time as the compensated second readings were obtained in order to compensate for changes in the instantaneous diameters due to at least three selected from a group consisting of weather, temperature, barometric pressure, and tire pressure changes; and
- navigating the vehicle based on the current pose.

9. The method of claim 8, wherein the previous pose comprises any of a position, orientation, or velocity of the vehicle.

10. The method of claim 8, wherein the adjusting the previous pose comprises:
- determining whether respective changes for each wheel between the one or more previous readings and the one or more readings match; and
- in response to determining that the respective changes for each wheel match:
  - determining a change in a position of the vehicle from the previous pose based on the one or more readings; and
  - determining a current pose based on the change in the position and the previous pose.

11. The method of claim 10, wherein the determining a change in the position of the vehicle comprises:
- determining a number of revolutions corresponding to the respective changes for each wheel; and
- determining a distance travelled by each wheel since the previous pose based on the number of revolutions and a diameter of each wheel.

12. The method of claim 8, wherein the obtaining the previous pose of the vehicle comprises obtaining a most recent pose of the vehicle before shutdown of the vehicle.

13. The method of claim 10, wherein the adjusting the previous pose comprises:
- in response to determining that the respective changes for each wheel do not match:
  - determining a change in the position of the vehicle from the previous pose based on the one or more readings, data from GPS, data from a LiDAR sensor, or data from an IMU.

14. The method of claim 10, wherein the adjusting the previous pose comprises:
- in response to determining that the respective changes for each wheel do not match:
  - determining a change in the position of the vehicle from the previous pose based on estimated changes in positions of each wheel.

* * * * *